Aug. 2, 1955 G. N. HOWATT ET AL 2,714,708

DELAY LINES

Filed May 12, 1950

GLENN N. HOWATT and
ABRAHAM I. DRANETZ INVENTORS.

BY Albert M. Parker
ATTORNEY.

United States Patent Office 2,714,708

Patented Aug. 2, 1955

2,714,708

DELAY LINES

Glenn N. Howatt and Abraham I. Dranetz, Metuchen, N. J., assignors to Gulton Mfg. Corp., Metuchen, N. J., a corporation of New Jersey Application May 12, 1950, Serial No. 161,586

1 Claim. (Cl. 333—30)

This invention relates to delay lines and more particularly to delay lines fabricated from suitable material formed ceramically.

There is a need for delay lines in a variety of devices, illustrations of which are the micro oscillograph, echo ranging devices, computing devices, counting circuits and pulse and timing circuits.

The present invention provides a delay line which is superior in many respects to delay lines heretofore employed. In the first place, the cost of fabrication of delay lines in accordance with this invention is far less than that of prior delay lines. The material employed in accordance with the invention may be molded, pressed, extruded, or formed in other suitable manner into any desired shape so that the mechanical features may be customed to the particular equipment with which the delay line is to be used. The ceramic material of the invention is mechanically rugged and with normal handling is not subject to breakage. Units in accordance with the invention are not affected by moisture.

The insertion loss of units in accordance with the invention is 30–40 db, which is much lower than that of the prior quartz-fused quartz type. Since the invention units can be made very light in weight and small in size they have definite physical advantages over the cumbersome mercury delay lines. Units in accordance with the invention have a distinct advantage over magnetostrictive delay lines in that they can pass higher frequencies. The fact that the delay line of the invention consists of one integral unit simplifies both fabrication and technical design problems.

It has been difficult in many prior delay circuits to maintain constant characteristics through a range of temperature variation. To overcome this drawback it has previously been necessary to insert sensitive circuit components to compensate for the temperature drifts of the original contact elements. Delay units in accordance with the invention have substantially constant properties over wide temperature ranges so, besides being simplified in and of themselves, they effect further simplification by the elimination of subsidiary compensating equipment.

It is accordingly a principal object of the invention to provide delay line constructions of wider effectiveness than has heretofore been the case.

Another object is to provide such constructions which are more simple and economical than anything heretofore employed.

Another object is to provide such constructions which are customed to the particular equipment with which they are employed.

Still another object is to provide such constructions in a wide variety of shapes and sizes.

A further object is to provide delay circuit elements which are easily handled while being capable of a wide variety of applications.

A further object is to provide such constructions which are light in weight and of small size.

More specific objects are to provide delay circuit elements which retain substantially constant properties over wide temperature ranges and which are unaffected by moisture.

Further and more detailed objects of the invention will in part be obvious and in part be pointed out as the description of the invention, taken in conjunction with the accompanying drawing proceeds.

Figure 1:
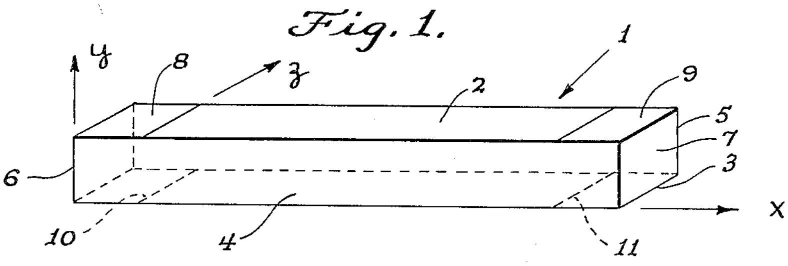
Figure 1 is a perspective view of a delay line unit in accordance with the invention.

The delay line unit indicated at 1 in Figure 1 is a strip of substantially barium titanate which is produced ceramically. The production of this material calls for rigid control of the composition of the raw materials employed. First, those materials are intimately blended with the necessary vehicles and binders by servere agitation and grinding. The blended mixture, or suspension, is next placed under a vacuum to eliminate any entrapped gases, since the presence of such gases tends to lower the tension and dielectric strength of the materials.

The mixture is then either cast, extruded, molded or formed in other suitable manner in the desired shape prior to firing. The elements so formed are then placed on pure ceramic tile and fired under exacting control conditions. For the economical production of high quality ceramics for this purpose, it is necessary to maintain a temperature tolerance of plus or minus 3° F. when firing at temperatures between 2400° F. and 2600° F.

The strip 1, as here shown, is rectangular in form, having upper and lower faces 2 and 3, sides 4 and 5, and ends 6 and 7.

After the strip of ceramic 1 is fired, as just described, electrodes are applied to the upper and lower faces 2 and 3 thereof, as indicated at 8, 9, 10 and 11. These electrodes, preferably of silver, though other suitable material may be employed, are applied by firing the coating on to the strip ceramically. The strip is then ready for prepolarization. Prepolarization is effected by applying the proper electric potential between the electrodes 8 and 10, and between the electrodes 9 and 11. This action produces piezoelectric characteristics within the volumes enclosed by the electrodes. As an example of the potential necessary to sensitize barium titanate ceramic material to render it piezoelectric, effective procedures for doing so call for applying a D. C. field of up to 200 volts per mil. for a period of approximately one hour in order to line up many of the domains within the strip. A mechanical wedging action is produced which causes most of the domains so aligned to keep their directions, though some lose them during a relaxation period of a few days.

The aligned dipoles contribute to the piezoelectric coupling. Once the material has been sensitized, as just described, the ceramic strip with its applied electrodes is effective for use as an accoustic delay line. This works in the following manner:

Considering the arrow Y as indicating the vertical transverse direction with respect to the strip 1, the arrow Z indicating the horizontal transverse direction and the arrow X the longitudinal direction; when an electric signal is applied between electrodes 8 and 10 the strip 1 is either expanded or contracted in the Y direction with compensating action in the X and Z directions, depending upon the polarity of the signal. This creates a mechanical wave which travels in the X direction. The rate of speed of that wave is to some extent dependent upon the dimensions and composition of the ceramic, but is generally of the order of 6 microseconds per inch.

When the energy wave reaches the volume enclosed by electrodes 9 and 11, it is converted into electrical energy again, hence an electrical impulse, or signal, may be taken off at a preselected time delay with respect to the input signal. The output signal may be of a single pulse, or a modulation of a high frequency.

The polarity of the output signal with respect to the input signal is dependent upon the polarity of prepolarization voltage applied to 8 and 10 compared to that of the voltage applied to 9 and 11. If the charging polarities are identical, the input and output signals are of the same polarity. If, however, the charging potentials are of the opposite, the input and output signals will likewise be opposite.

The electrodes 8 and 10 can be removed from the top 2 and the bottom 3 after prepolarization and new electrodes can be applied to the side faces 4 and 5. Likewise, the electrodes 9 and 11 can be removed from the top 2 and the bottom 3 and new electrodes can be applied to the side faces 4 and 5.

Figure 2:
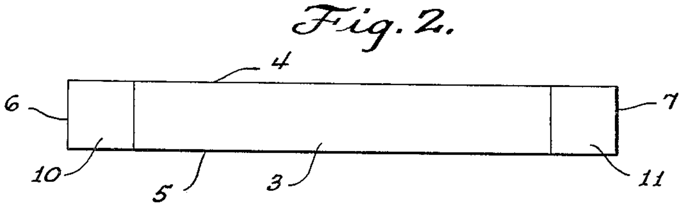
Figure 2 is a bottom plan view thereof.
Figure 3:
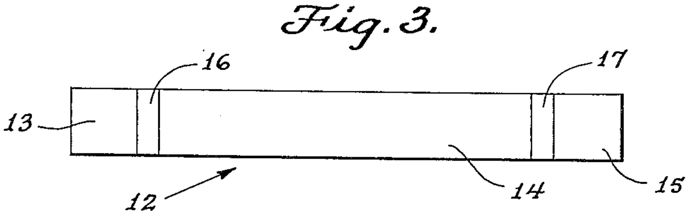
Figure 3 is a top plan view of a modified form of the invention.

Instead of merely applying small section electrodes as at 8, 9, 10 and 11, other manners and types of application may be practiced. In other words, both top and bottom may be provided with a complete coating of silver. Prepolarization may be effected with a coating completed, or after small sections of the silver have been removed across each face so as to electrically separate input and output electric terminals. A delay line element so formed is shown generally at 12 in Figure 3. This figure shows a plan view of an element comparable in outline to the element of Figures 1 and 2, but the Figure 3 showing is, of course, merely a plan view. Here, the silver, or other metal, electrode sections are shown at 13, 14 and 15, with sections of uncoated ceramic at 16 and 17. This form results from coating the whole of the face with silver and removing the silver at 16 and 17.

Additional electrode elements may be provided, if desired, by removing further sections of the silver, such as in the portion 14. Moreover, it is not necessary to have electrodes at the ends of the element such as 13 and 15. Instead, they may be eliminated and similar electrodes may be furnished inwardly from the ends of the element. On the contrary, opposite faces of the ceramic body may be completely silvered with sections of the silver being removed from only one of the silvered faces, thus the completely silvered face becomes a common terminal to both input and output electrodes.

With respect to the prepolarization, the ends of the ceramic element may be prepolarized in the Y—Z or any space angular direction, and opposite ends of an element may be polarized in different directions from each other. Likewise, the input or output electrodes can be applied for connection in the Y, Z, or any angular direction. The velocity of accoustic propagation is, of course, dependent upon whether a longitudinal, or shear, wave is produced, the velocity of a shear wave being considerably less than that of the longitudinal wave.

The waves of energy produced in delay line elements just considered are subject to reflection from the ends of such elements. This effect may be employed to form a large series of impulses which, if timed properly, can be built up to a large impulse. In certain instances, however, it is undesirable to have these end reflections, and the invention contemplates several methods of eliminating them.

Reflections can be reduced by the proper accoustic termination of the reflecting end in an absorbing medium. Another effective method is to create out of phase, or opposite phase, reflective waves which partially, or entirely, cancel each other out.

Figure 4:
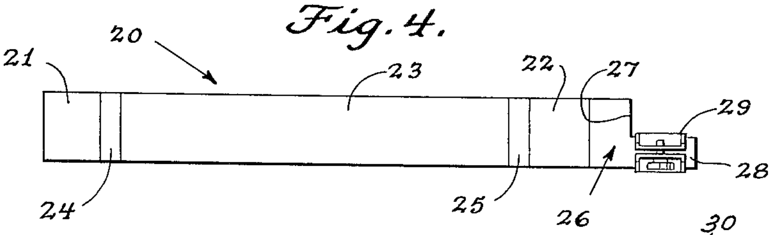
Figure 4 is another modification thereof.
Figure 5:
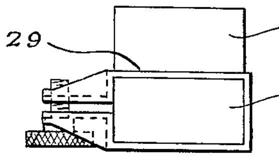
Figure 5 is a right hand end elevation of the Figure 4 construction.

A structural method which incorporates the correction of end reflections in the body of the delay element itself is shown in Figure 4. Here the body of ceramic barium titanate, generally indicated at 20, has silvered, or other electrode portions 21, 22 and 23, which are separated by removing the silver at the portions 24 and 25. One end of the body 20, as indicated generally at 26, is split and has one part thereof removed so that the shoulder part of the end terminates at the surface 27, while the remainder continues on into the projection 28. A tight clamp 29 is then applied over the projection 28.

The surface 27 presents a mechanical short circuit to the oncoming accoustic wave, while the clamping of the projection 28 presents a mechanical open circuit to the oncoming wave. Thus the waves are reflected from the end 27 and the termination across the projection 28, are opposed in phase, and cancel each other out.

Instead of applying a clamp, as indicated at 29, reflections may be eliminated by terminating the delay line in a complete circular or oval section of highly accoustic loss, closing it so as not to allow a return of the signal to the main section of the line.

For increasing the time of delay, the energy wave may, by proper electrode focusing, be caused to reflect back and forth between the side walls of a rectangular member as it travels there along. This action may be additionally aided by cutting the ceramic into a zig-zag pattern. If, instead of a rectangular delay line element the same is shaped in the form of a tube with electrodes on the inner and outer walls thereof, the delay time may be increased by cutting such tube into the form of a helix.

If the ceramic to be employed for effecting a time delay is in plate form, the placing of the electrodes can be used for effecting the time delay. They may be applied to the ceramic in forms such as squares, circles, or dots, scattered throughout the surfaces.

Figure 6:
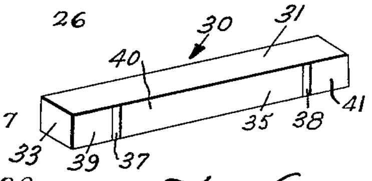
Figure 6 is a perspective view of another modification of the invention as viewed from above and from one side thereof.
Figure 7:
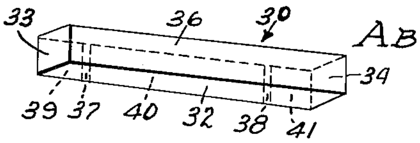
Figure 7 is a perspective view of the modification of Figure 6 as viewed from below and from the opposite side thereof.

The modification illustrated in Figures 6 and 7 is that briefly referred to in lines 7 to 10 on page 6. In this modification the ceramic body generally indicated at 30 has a top surface 31, a bottom surface 32, ends 33 and 34, and opposed sides 35 and 36. The side 36 is completely silvered throughout and becomes a common terminal to both input and output electrodes. The surface 35, however, has had portions of the complete silver facing removed at 37 and 38 to electrically separate the sections 39, 40 and 41 from each other. Thus various combinations of the sections 39, 40 and 41 may be used in selecting a pair of electrodes.

From the foregoing, it is believed to be apparent that the employment of an element essentially of barium titanate ceramic makes possible the construction of relatively inexpensive and easily handled delay circuits for many applications. They readily supplant the cumbersome devices presently employed for these purposes and open up fields of use to which the prior art devices are in no way applicable. An illustration of this latter is as small scale simulators for the study of various phenomena in larger bodies.

Certain changes in the above article, in carrying out the above method and in the construction set forth which embody the invention may be made without departing from its scope. Thus, it is intended that all matter contained in the above description, or shown in the accompanying drawing shall be interpreted in an illustrative and not in a limiting sense.

Having described our invention, what we claim as new and desire to secure by Letters Patent is:

In a delay line, a ceramic body formed with definite sides and ends, said body being composed substantially of finely divided particles of a titanate capable of polarization, one end of said body terminating in a stepped construction, said stepped construction including a terminating end on said body and an integral projection extending outwardly therefrom and a clamp engaged with said projection and tightly clamping the same whereby the end reflections from the terminating end and from the projection are opposed in phase and are cancelled out.

References Cited in the file of this patent

UNITED STATES PATENTS

| | | |
|---|---|---|
| 1,781,680 | Cady | Nov. 18, 1930 |
| 2,240,293 | Goddard | Apr. 29, 1941 |
| 2,276,013 | Bohannon | Mar. 10, 1942 |
| 2,361,998 | Fleming-Williams | Nov. 7, 1944 |
| 2,538,554 | Cherry, Jr. | Jan. 16, 1951 |
| 2,540,412 | Adler | Feb. 6, 1951 |

OTHER REFERENCES

Article, "Improved Ultrasonic Delay Lines" by Metz and Anderson. Published in "Electronics" July 1949, pages 96–100. (Copy in 178–44–18A.)